2,912,439
DIVINYL-1,4-DIOXANES AND CROSS-LINKED POLYMERS THEREOF

Robert H. Hasek, Kingsport, Tenn., and James E. Hardwicke, Ridgewood, N.J., assignors to Eastman Kodak Company, Rochester, N.Y., a corporation of New Jersey No Drawing. Application December 17, 1956
Serial No. 628,495

6 Claims. (Cl. 260—340.6)

This invention relates to divinyl-1,4-dioxanes, to polymers thereof, and to a process for preparing the same.

The new monomeric compounds of the invention may be represented by the following formulas:

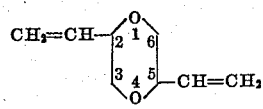 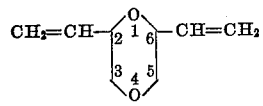

that is, 2,5-divinyl-1,4-dioxane and 2,6-divinyl-1,4-dioxane. The new compounds can be readily carboxylated to dibasic acids or converted by the Oxo process to glycols which are valuable monomers for imparting hydrophilic characteristics to polyesters, but more particularly they are useful as cross-linking agents in addition polymerizations to impart thermosetting properties, for example, to vinyl and other similar polymers.

It is, accordingly, an object of the invention to provide a new class of 1,4-dioxanes. Another object is to provide resinous polymers thereof. Another object is to provide means for preparing the above compounds. Other objects will become apparent hereinafter.

In accordance with the invention, we prepare our new compounds by heating 2-butene-1,4-diol with a catalytic amount of a mercuric or mercurous salt such as the sulfates, oxides, nitrates, chlorides and acetates of mercury, while removing the water as fast as it is formed from the reaction mixture, until an amount of water equivalent to the moles of 2-butene-1,4-diol employed is obtained, and then separating the divinyl-1,4-dioxane product preferably by distillation of the reaction mixture. The principal product is 2,5-divinyl-1,4-dioxane which may under some conditions also contain a minor proportion of the isomeric 2,6-divinyl-1,4-dioxane. Advantageously, the reaction may be carried out in an inert solvent medium having a boiling point close to the desired temperature of reaction so that it serves to regulate the temperature of the reaction. By a proper choice of the solvent e.g. one that forms an azeotrope with water, the solvent can also function as an agent for the removal of the water formed from the system. In this respect, it is not necessary that the azeotroping agent be a true solvent; that is, it is not necessary that the butenediol be soluble therein. Suitable solvent agents of this kind include aromatic hydrocarbon solvents such as benzene, toluene, xylene, etc., halogenated aliphatic hydrocarbons such as carbon tetrachloride, etc., alkyl esters such as ethyl acetate, n-butyl acetate, and the like. In the preferred procedure, a mixture of 2-butene-1,4-diol and an azeotroping agent is refluxed in contact with from 0.5 to 5%, based on the weight of the diol, of the mentioned mercury compound, but preferably mercuric sulfate, water being removed as formed, until about one mole of water is obtained for each mole of 2-butene-1,4-diol employed. The temperature of the reaction may be carried out over a wide range, but it is too slow to be practical below about 50° C., and above 200° C. resinous byproducts are obtained. The preferred temperature range is from 70° to 140° C. The principal product 2,5-divinyl-1,4-dioxane is then separated by fractional distillation of the reaction mixture, preferably in the presence of an added dehydrating and neutralizing agent such as an alkali metal carbonate such as potassium or sodium carbonate or an alkali metal hydroxide such as sodium or potassium hydroxide.

The polymerizations wherein the new 2,5-divinyl-1,4-dioxane and 2,6-divinyl-1,4-dioxane are employed, singly or in admixture, as cross-linking agents to form resinous polymers of modified solubilities and having thermosetting properties with one or more vinyl or other unsaturated monomers, i.e. monoethyleneically unsaturated, polymerizable compounds containing a $CH_2=C<$ group, may be carried out in mass or dispersed in an inert liquid reaction medium such as water, in the presence of a polymerization catalyst. Heat accelerates the polymerizations. Suitable polymerization catalysts include peroxides such as benzoyl peroxide, acetyl peroxide, lauroyl peroxide, di-ter.-butyl peroxide, hydrogen peroxide, sodium or potassium persulfates, sodium or potassium perborates, etc. The amount of catalyst can vary from about 0.1 to 3.0%, based on the weight of the monomers to be polymerized. The temperature can vary over a wide range but preferably the polymerizations are carried out at from about 30° to 100° C. Polymerization activating agents such as alkali metal bisulfites e.g. sodium or potassium bisulfite may also be used in about the same amount as the catalyst, as well as surface active agents such as fatty alcohol sulfates e.g. sodium or potassium cetyl sulfate, sodium or potassium lauryl sulfate, etc., aromatic sulfonates e.g. sodium or potassium salts of alkylnaphthalene sulfonic acid, sulfonated oils, and the like. The surface active agents may be employed up to about 3–5% of the weight of the components to be polymerized. Where the polymerizations are carried out in mass, the monomer or monomers are simply mixed with the divinyl-1,4-dioxane, together with the catalysts and other agents, and the mixture then agitated or rolled under heated conditions until the components have polymerized to give a cross-linked resinous polymer. Where the polymerizations are carried out in water, the monomers are advantageously first emulsified with one of the mentioned surface active agents and the catalyst added, followed by heating the mixture with stirring or tumbling until a cross-linked resinous polymer has been obtained. The polymer can be isolated by breaking up the emulsion with a salt solution or the emulsions can in some cases be used directly for various applications of coating, sizing, impregnation of porous or fibrous materials etc. The proportions of the divinyl-1,4-dioxanes employed in the polymerizations may vary over wide limits, but preferably from about 0.5% to 5%, based on the total weight of the vinyl or other unsaturated monomers to be polymerized and cross-linked.

Suitable monoethylenically unsaturated, polymerizable compounds containing a $CH_2=C<$ group, that may be employed for preparing the cross-linked resinous compositions or copolymers of the invention include, for example, vinyl esters of carboxylic acids wherein the acid radical contains from 1 to 7 carbon atoms such as vinyl acetate, vinyl butyrate, vinyl trifluoroacetate, vinyl benzoate, etc., vinyl alkyl ketones such as methyl vinyl ketone, ethyl vinyl ketone, etc., vinyl alkyl ethers such as methyl vinyl ether, butyl vinyl ether, etc., vinyl sulfonamides such as vinyl sulfonamide, N-methyl vinyl sulfonamide, etc., vinyl halides such as vinyl chloride, vinyl bromide, vinyl fluoride, etc., vinyl alkyl sulfones such as vinyl methyl sulfone, etc., vinyl urethanes such as vinyl methyl urethane, etc., cyclic vinyl imides such as vinyl succinimide, vinyl phthalimide, etc., acrylic acid and its anhydride, amide, N-alkyl amides, nitrile and the methyl, ethyl, butyl, benzyl, phenyl, etc. esters, methacrylic acid and its anhydride, amide, N-alkyl amides, nitrile and the methyl, ethyl, butyl, benzyl, phenyl, etc. esters, vinylidene chloride, vinylidene chloridefluoride, vinylidene cyanide, and similar compounds. One or more of the above type of polymerizable monomers may be employed in the polymerization reaction mixture with one or more of the divinyl-1,4-dioxanes of the invention to give the corresponding cross-linked and thermosetting resinous polymer. In general, the polymers obtained will contain about the same proportion of constituents in combination as were present in the starting polymerization mixtures. Also, while the cross-linked copolymers obtained from two or more of the above mentioned monoethylenically unsaturated, polymerizable compounds in the manner described can contain any proportions of said compounds, it is preferred that such cross-linked copolymers should contain not less than 5% by weight of any one of the said monoethylenically unsaturated compounds.

The following examples will serve to illustrate further our new unsaturates, polymers thereof, and the manner of preparing the same.

Example 1

A mixture of 176 parts by weight of 85% 2-butene-1,4-diol, 4 parts by weight of mercuric sulfate and 100 parts by weight of benzene was heated at reflux temperature, and water was removed continuously by a modified Dean and Stark trap. When no more water was formed (after 3 hours), the reaction mixture was filtered, and the filtrate was distilled in the presence of 2 g. of potassium hydroxide after removal of the benzene. There were obtained 86 parts by weight (72% of calculated theory) of 2,5-divinyl-1,4-dioxane, B.P. 46° C./5 mm., $n_D^{20}$ 1.4592 and $d_4^{20}$ 0.9734. Analysis showed that it contained by weight 68.4% of carbon and 8.6% of hydrogen compared with calculated for $C_8H_{12}O_2$ of 68.5% and 8.6%, respectively. An infrared absorption study showed the presence of vinyl, ether, $CH_2$— and CH— linkages.

Example 2

A mixture of 88 parts by weight of 85% 2-butene-1,4-diol, 100 parts by weight of benzene and 0.5 part by weight of mercuric nitrate was refluxed and the water removed continuously as formed. When no more water was produced, the reaction mixture was decanted from the catalyst and then distilled in the presence of 2 g. of sodium hydroxide. There were obtained 30 parts by weight 2,5-divinyl-1,4-dioxane (50% yield), B.P. 46° C./5 mm.

Example 3

A mixture of 88 parts by weight of 85% 2-butene-1,4-diol and 0.5 part by weight of mercuric chloride was refluxed (B.P. 200°–165° C.) and water was distilled from the reaction mixture as formed. When no more water was produced (after 2 hours' refluxing), the liquid was decanted from the catalyst and distilled at reduced pressure in the presence of 2 g. of potassium hydroxide to give 10 parts by weight of product boiling at 46°–48° C. at 5 mm. pressure. Analysis indicated that this product was essentially 2,5-divinyl-1,4-dioxane.

Example 4

A mixture of 44 parts by weight of 85% 2-butene-1,4-diol and 2 parts by weight of mercurous sulfate was refluxed and the water was distilled from the reaction mixture as formed. When no more water was formed, the product was filtered and distilled in the presence of 2 g. of potassium carbonate to give 19.5 parts by weight of product boiling at 162–168° C. at atmospheric pressure. Analysis indicated that this product was essentially 2,5-divinyl-1,4-dioxane.

Example 5

A mixture of 88 parts by weight of 85% 2-butene-1,4-diol, 100 parts by weight of benzene, 2 parts by weight of red mercuric oxide and 0.5 part by weight of concentrated sulfuric acid was refluxed and the water was removed continuously as formed. When no further water was produced, the reaction mixture was cooled, filtered and then distilled in the presence of 2 g. of sodium hydroxide. There were obtained 41 parts by weight of product (60% yield) of 2,5-divinyl-1,4-dioxane, B.P. 46° C./5 mm.

Example 6

A mixture of 880 parts by weight of 80% 2-butene-1,4-diol, 1000 parts by weight of benzene and 20 parts by weight of mercuric sulfate was placed in a 5-liter flask fitted with a sealed stirrer, a modified Dean and Stark trap, and a reflux condenser. Stirring was started and the mixture was heated to reflux. Water was removed continuously as formed. The pot temperature ranged from 75° to 92° C. After 4 hours, the reaction was complete. The reaction mixture was cooled, filtered and distilled at atmospheric pressure from 20 parts by weight of potassium hydroxide pellets. After the removal of the benzene, there were obtained 430 parts by weight of essentially 2,5-divinyl-1,4-dioxane boiling at 167°–169° C./760 mm. The yield was 76.8% of calculated theory.

Example 7

The utility of the 2,5-divinyl-1,4-dioxane as a cross-linking agent is illustrated by the following example.

A mixture of 3.18 g. of N-isopropylacrylamide, 12 g. of acrylonitrile, 0.6 g. of Duponol ME (a fatty alcohol sulfate), 0.3 g. of potassium persulfate, 0.3 g. of 2,5-divinyl-1,4-dioxane and 0.3 g. of sodium bisulfite was rolled at 53° C. for a period of 16 hours. A highly cross-linked copolymeric resin containing the above unsaturates in combination in the indicated proportions was obtained. It was insoluble in dimethyl formamide. Treatment of cellulose acetate fiber with this resin modified the fiber in such a way that it could be dyed with acid wool dyes.

In place of the acrylamide in the above example, there may be substituted a like amount of methyacrylamide, or an N-alkyl substituted compound such as N-methyl acrylamide, N-methyl methacrylamide, etc. to give generally similar resinous copolymers of modified solubilities. Also, in place of the acrylonitrile in the above example, there may be substituted a like amount of methacrylonitrile to give generally similar products. However, the process of the above example may be employed with combinations of 2,5-divinyl-1,4-dioxane or 2,6-divinyl-1,4-dioxane or mixtures thereof with any of the aforementioned monoethylenically unsaturated, polymerizable compounds containing a $CH_2=C<$ group, for example, N-isopropylacrylamide or N-methyl methacrylamide or vinyl acetate, or methyl acrylate, etc. alone with the divinyl-1,4-dioxane up to about 5% by weight. Also, the process of the above example may be employed with combinations of two of the aforementioned monoethylenically unsaturated, polymerizable compounds containing a $CH_2=C<$ group, in the proportions of from 5 to 95% by weight of either of said compounds, and up to 5%, based on the weight of the mixture of monomers, of the divinyl-1,4-dioxane. All of these resinous compositions exhibit cross-linked properties. They can also be modified further by the addition of fillers, pigments, plasticizers, and the like. Many of the contemplated resinous compositions of the invention may also be employed for the preparation of thermosetting sheets, films etc., and for shaped molded objects.

What we claim is:

1. A process for preparing a divinyl-1,4-dioxane selected from the group consisting of 2,5-divinyl-1,4-dioxane and 2,6-divinyl-1,4-dioxane, which comprises heating a mixture comprising a 2-butene-1,4-diol in the presence of a mercury salt selected from the group consisting of a sulfate of mercury, an oxide of mercury, a nitrate of mercury, a chloride of mercury and an acetate of mercury, at from 50° to 200° C., distilling off the water of reaction as formed, and separating the formed divinyl-1,4-dioxane from the reaction mixture.

2. A process for preparing 2,5-divinyl-1,4-dioxane which comprises heating 2-butene-1,4-diol in the presence of mercuric sulfate, at from 70° to 140° C., distilling off the water of reaction as formed, adding an alkaline compound selected from the group consisting of sodium hydroxide, potassium hydroxide, sodium carbonate and potassium carbonate and separating the formed 2,5-divinyl-1,4-dioxane from the reaction mixture.

3. A process for preparing 2,5-divinyl-1,4-dioxane which comprises heating a mixture of 2-butene-1,4-diol in benzene and in the presence of mercuric sulfate, at from 70° to 140° C., distilling off the water of reaction as formed, adding potassium hydroxide, and separating the formed 2,5-divinyl-1,4-dioxane from the reaction mixture.

4. A process for preparing 2,5-divinyl-1,4-dioxane which comprises heating a mixture of 2-butene-1,4-diol in benzene in the presence of mercuric nitrate, at from 70° to 140° C., distilling off the water of reaction as formed, adding sodium hydroxide, and separating the 2,5-divinyl-1,4-dioxane from the reaction mixture.

5. A process for preparing 2,5-divinyl-1,4-dioxane which comprises heating 2-butene-1,4-diol in the presence of mercurous sulfate, at from 70° to 140° C., distilling off the water of reaction as formed, adding potassium carbonate, and separating the formed 2,5-divinyl-1,4-dioxane from the reaction mixture.

6. A process for preparing 2,5-divinyl-1,4-dioxane which comprises heating a mixture of 2-butene-1,4-diol in benzene and in the presence of red mercuric oxide and sulfuric acid, at from 70° to 140° C., adding sodium hydroxide in an amount more than sufficient to neutralize any residual sulfuric acid, and separating the formed 2,5-divinyl-1,4-dioxane from the reaction mixture.

References Cited in the file of this patent

UNITED STATES PATENTS

| | | |
|---|---|---|
| 2,195,386 | Britton et al. | Mar. 26, 1940 |
| 2,361,456 | Chitwood | Oct. 31, 1944 |
| 2,373,956 | Hearne et al. | Apr. 17, 1945 |
| 2,739,140 | Price et al. | Mar. 20, 1956 |
| 2,777,832 | Mallison | Jan. 15, 1957 |

OTHER REFERENCES

R. K. Summerbell et al.: J. Am. Chem. Soc., vol. 58, pp. 759–761, May 1936.